R. W. Perkins,
Rubber Boot.
No. 102,314.    Patented Apr. 26, 1870.
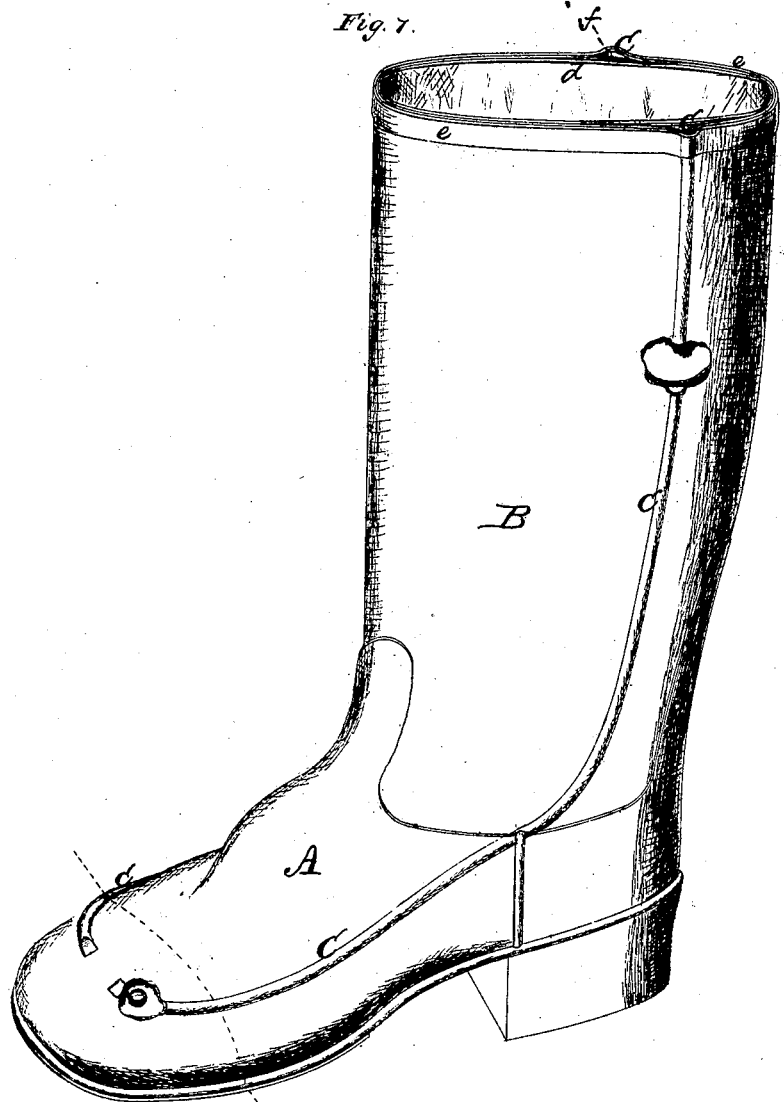

United States Patent Office.

R. W. PERKINS, OF COLCHESTER, CONNECTICUT, ASSIGNOR TO W. H. HAYWARD, OF SAME PLACE.

Letters Patent No. 102,314, dated April 26, 1870.

IMPROVED VENTILATED RUBBER BOOT.

The Schedule referred to in these Letters Patent and making part of the same.

*To all whom it may concern:*

Be it known that I, R. W. PERKINS, of Colchester, of the county of New London, in the State of Connecticut, have invented a new and useful Improvement in Ventilated Rubber Boots; and I do hereby declare that the following is a full and exact description thereof, reference being had to the accompanying drawings making part of this application.

My invention relates to a new and useful improvement in ventilated rubber boots.

Previous to my invention various plans have been suggested for effecting a thorough ventilation in rubber boots, among the most practical and successful of which is that in which several channels are formed— during the process of manufacture of the boot—between the rubber outer portion and the cloth lining of the boot, which channels extend from the top edge of the leg down to the toe-portion of the "upper," and communicate, at their lower ends, with the interior of the boot by holes in the cloth lining.

In this kind of ventilated boots there is a liability of the conduits or air-passages to collapse, owing to the extremely pliable nature of the cloth lining, (which forms one side of the said conduit,) and, since the air-passage loses its usefulness if liable to become wholly or nearly closed, the great advantage of some simple and economic preventive for this objectionable liability will be readily appreciated.

My invention has for its object to overcome the difficulty described in that kind of rubber ventilated boots which has the air-passage or passages formed between the rubber and cloth portions of the boot, and to this end and the end of affording a better article with comparatively little, or no additional expense, My invention consists in laying a strip of rubber or other equivalent material on the outer surface of the lining where the channel or air-passage is formed, to stiffen the inner wall of the channel, as hereinafter more fully explained.

To enable those skilled in the art to make and use my improvement, I will more fully describe it, referring by letters to the accompanying drawings, in which—

Figure 1 is an elevation, and

Figure 2, a cross-section of a rubber boot embodying my invention.

At fig. 1 I have shown a portion of the stock broken out for the purposes of illustration.

In the several figures the same part is designated by the same letter of reference.

A represents the foot portion, and

B, the leg portion of a rubber boot.

C C are two ventilating-tubes or air-channels, which are formed between the lining D (which is generally made of cloth or felt) and the outer rubber portion E, and F is a stiffener or piping, formed of a strip of rubber which is laid on the external surface (or that surface adjacent to the rubber outer) of the lining D.

The function of this strip of rubber F is to render the inner wall of the tube C (or that portion of the boot-lining which forms part of the air-conduit) more rigid or stiffer, so that there will be no liability of the air-passage to collapse, and so that, if said channel or passage be closed temporarily, in consequence of the forcing together of its walls by any position of the foot and leg of the person wearing the boot, it will immediately, upon being relieved of such strained condition, spring open again.

In the manufacture of this kind of boot the air-passages are formed, and the piping or strip for insuring the distension of said passages applied in the following manner:

The lining D is put on the wooden last in the usual manner, and the strip F is then laid and stuck on, (the proper holes being cut through at the lower, as seen at I.)

A core, formed of a cord of suitable diameter, is then applied over the strip F, and the rubber E molded or laid in shape over it on the last or form.

When the boot has been thus formed on the last, the rubber E, adhering to the lining D, and the cord or core confined between the outer E and the rubber-stiffener F, it is put in the furnace and subjected to the usual desulphurizing process.

After the boot is desulphurized the cord core is withdrawn, leaving the air-channel or conduits C, as shown. I have successfully used the cord cores, making them serve many times over and over, but, of course, some other pliable and flexible core might be used in lieu of the simple cord, which I have found to work well.

It will be understood that, although the rubber strip F will not be protruded, (or bulged,) inward, since it rests against the last or form (with the lining D interposed) during the molding and desulphurizing processes, it will always have a tendency to remain in the position or condition in which it was during the formation and at the time of the completion of the boot, and that, whenever the tube may be collapsed or its walls pressed together, this rubber strip F (like the rubber outer wall of the channel) will have a tendency to assume its normal condition when unrestrained, and thus always hold open the conduit or air-passage C.

I am aware that it has been suggested to form the air-passage or passages for ventilated rubber boots between the rubber and cloth portions, and that the cord core has been used to form the conduits, as I have herein described, and I wish to be understood as not claiming either of these characteristic features; but Having fully explained my improvement,

What I claim as new, and desire to secure by Letters Patent, is—

The employment in a ventilated rubber boot, having a channel or channels formed between the rubber and the lining, of a strip of rubber, F, or its equivalent, substantially in the manner and for the purposes stated and set forth.

In testimony whereof I have hereunto set my hand and seal this 18th day of October, A. D. 1869.

R. W. PERKINS. [L. S.]

Witnesses:
JOSIAH A. COLEMAN,
JOSEPH N. ADAMS.